(12) United States Patent
Kozuka et al.

(10) Patent No.: US 10,474,907 B2
(45) Date of Patent: Nov. 12, 2019

(54) APPARATUS THAT PRESENTS RESULT OF RECOGNITION OF RECOGNITION TARGET

(71) Applicant: Panasonic Intellectual Property Corporation of America, Torrance, CA (US)

(72) Inventors: Kazuki Kozuka, Osaka (JP); Ryota Fujimura, Kanagawa (JP); Masahiko Saito, Osaka (JP); Tetsuji Fuchikami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 143 days.

(21) Appl. No.: 15/439,987

(22) Filed: Feb. 23, 2017

(65) Prior Publication Data

US 2017/0262710 A1    Sep. 14, 2017

Related U.S. Application Data

(60) Provisional application No. 62/306,176, filed on Mar. 10, 2016.

(30) Foreign Application Priority Data

Oct. 27, 2016    (JP) ................................. 2016-210329

(51) Int. Cl.
*G06K 9/00*    (2006.01)
*B60Q 1/26*    (2006.01)
(Continued)

(52) U.S. Cl.
CPC ........... *G06K 9/00791* (2013.01); *B60Q 1/26* (2013.01); *G05D 1/0214* (2013.01);
(Continued)

(58) Field of Classification Search
USPC .......................................................... 348/148
See application file for complete search history.

(56) References Cited

U.S. PATENT DOCUMENTS 3,779,492 A * 12/1973 Grumet ................. F41G 7/2226
                                                          244/3.17
9,321,395 B2 * 4/2016 Ammar ..................... B60R 1/12
(Continued)

FOREIGN PATENT DOCUMENTS

EP          2896937 A1      7/2015
JP         2003-327041     11/2003
JP        2008055942 A  *  3/2008

OTHER PUBLICATIONS

The Extended European Search Report dated Sep. 22, 2017 for the related European Patent Application No. 17157070.8.

*Primary Examiner* — Dave Czekaj
*Assistant Examiner* — Shanika M Brumfield
(74) *Attorney, Agent, or Firm* — Greenblum & Bernstein, P.L.C.

(57) ABSTRACT

An apparatus and a method capable of accurately recognizing that a person will appear on a road and certainly notifying the person that an autonomous moving body has recognized a place where the person will appear are disclosed. An apparatus according to an embodiment of the present disclosure detects, as a recognition target, a person appearance area, in which a person will appear, formed by a recognition target presentation apparatus on a road and presents, to the person, a result of recognition indicating that the autonomous moving body has recognized the person appearance area as a result of the detection of the recognition target.

14 Claims, 15 Drawing Sheets

(51) Int. Cl.
*G05D 1/02* (2006.01)
*G08G 1/16* (2006.01)

(52) U.S. Cl.
CPC ....... *G05D 1/0246* (2013.01); *G06K 9/00362* (2013.01); *G08G 1/166* (2013.01)

(56) References Cited

U.S. PATENT DOCUMENTS

| | | | | |
|---|---|---|---|---|
| 9,771,021 | B1* | 9/2017 | Lindsay | B60Q 1/525 |
| 2007/0115138 | A1* | 5/2007 | Arakawa | B60R 1/00 340/901 |
| 2009/0060273 | A1* | 3/2009 | Stephan | G06K 9/42 382/103 |
| 2009/0066255 | A1* | 3/2009 | Nakayama | B60Q 1/323 315/77 |
| 2009/0189753 | A1* | 7/2009 | Enya | G02B 27/01 340/435 |
| 2010/0321945 | A1 | 12/2010 | Lang et al. | |
| 2011/0175717 | A1* | 7/2011 | Drong | B60Q 1/22 340/463 |
| 2012/0075875 | A1* | 3/2012 | Son | B60Q 1/50 362/487 |
| 2013/0003403 | A1* | 1/2013 | Takahira | B60Q 1/0023 362/538 |
| 2013/0120130 | A1* | 5/2013 | Cha | B60R 3/02 340/468 |
| 2013/0128601 | A1* | 5/2013 | Kim | B60Q 1/2607 362/511 |
| 2014/0062685 | A1* | 3/2014 | Tamatsu | B60Q 5/005 340/425.5 |
| 2014/0085470 | A1* | 3/2014 | Sako | G03B 21/006 348/148 |
| 2014/0320823 | A1* | 10/2014 | Ammar | B60R 1/12 353/13 |
| 2015/0258928 | A1* | 9/2015 | Goto | B60Q 1/085 701/49 |
| 2015/0329043 | A1* | 11/2015 | Skvarce | B60Q 9/008 340/435 |
| 2016/0229333 | A1* | 8/2016 | Shiraki | B60Q 1/26 |
| 2016/0379063 | A1* | 12/2016 | Sorstedt | B60Q 1/525 348/148 |

* cited by examiner

APPARATUS THAT PRESENTS RESULT OF RECOGNITION OF RECOGNITION TARGET

BACKGROUND

1. Technical Field

The present disclosure relates to a recognition result presentation apparatus and a method for presenting a result of recognition that present a result of recognition of a recognition target presented by a recognition target presentation apparatus in a moving direction of an autonomous moving body. The present disclosure also relates to a recognition target presentation apparatus and a method for presenting a recognition target that present a recognition target recognizable by an autonomous moving body.

2. Description of the Related Art

During these years, autonomous vehicles are being developed. If autonomous vehicles become widespread in the future, valet parking will be performed by the autonomous vehicles. In this case, an autonomous vehicle passes by a vehicle that has already stopped, but a person getting out of the stationary vehicle can't tell whether he/she has been recognized by the autonomous vehicle and determine whether he/she can walk in front of the autonomous vehicle.

In Japanese Unexamined Patent Application Publication No. 2003-327041, for example, when a sliding door of a vehicle is open, a light source unit of a light emission device directly radiates light downward from the sliding door. As a result, for example, a road surface is illuminated to attract attention from pedestrians and drivers of vehicles behind and beside.

SUMMARY

In the above example of the related art, however, although a driver of a vehicle behind can recognize that a person is getting out since a road surface below a sliding door is illuminated, it is difficult, if the vehicle behind is an autonomous vehicle, for the autonomous vehicle to recognize that the person is getting out. Improvements, therefore, are necessary.

One non-limiting and exemplary embodiment presents a recognition result presentation apparatus, a method for presenting a result of recognition, a recognition target presentation apparatus, and a method for presenting a recognition target capable of accurately recognizing that a person will appear on a road and certainly notifying the person that a place where the person will appear has been recognized by an autonomous moving body.

In one general aspect, the techniques disclosed here feature a recognition result presentation apparatus that presents a result of recognition of a recognition target presented by a recognition target presentation apparatus in a moving direction of an autonomous moving body. The recognition result presentation apparatus includes a detector that detects, as the recognition target, a person appearance area, in which a person will appear, formed by the recognition target presentation apparatus on a road and a presenter that presents, to the person, a result of recognition indicating that the autonomous moving body has recognized the person appearance area as a result of the detection of the recognition target performed by the detector.

According to the present disclosure, it can be accurately recognized that a person will appear on a road, and the person can be certainly notified that an autonomous moving body has recognized a place where the person will appear.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
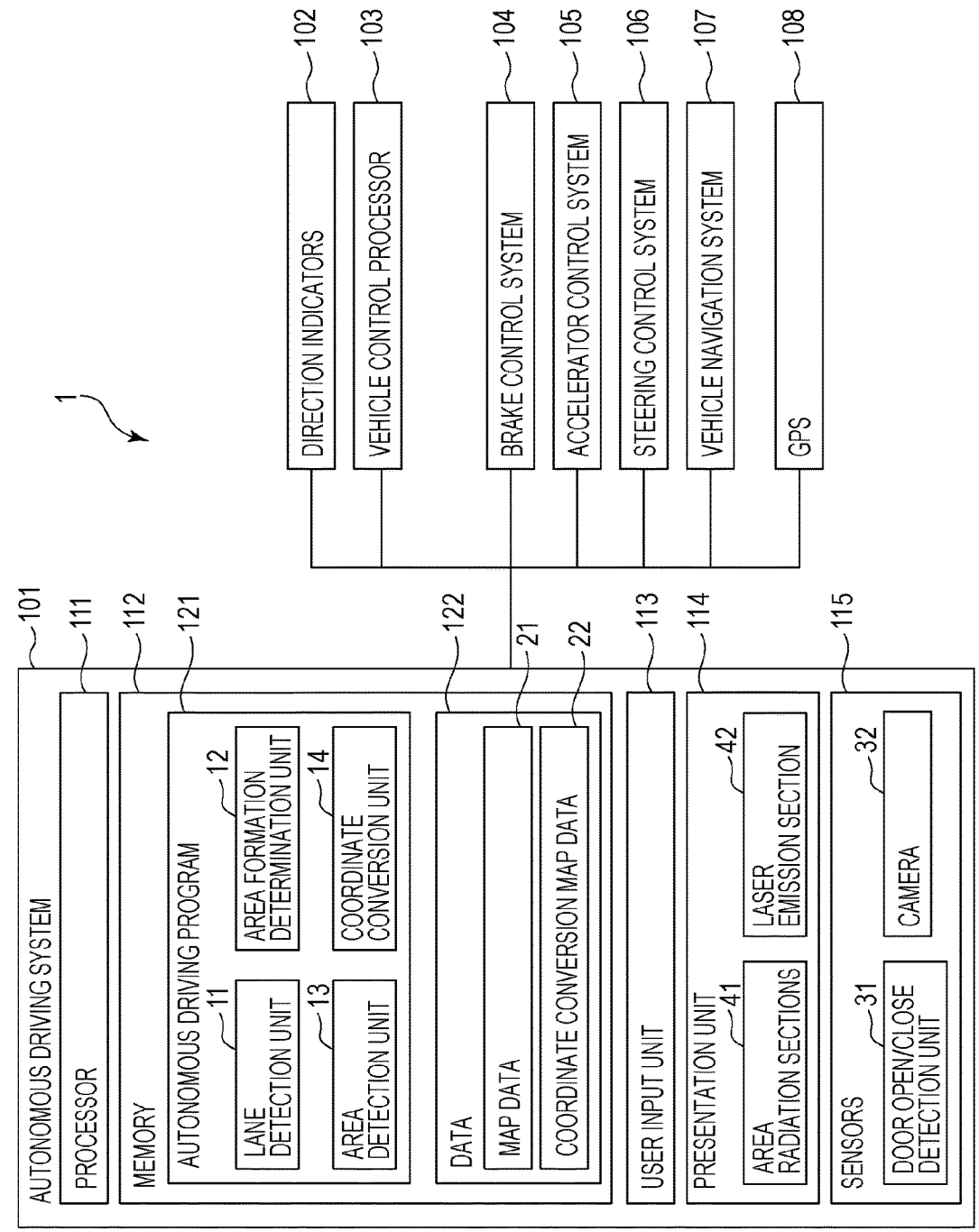
FIG. 1 is a block diagram illustrating the configuration of an autonomous vehicle according to a first embodiment.

Underlying Knowledge Forming Basis of Present Disclosure

As described above, if autonomous vehicles become widespread in the future, valet parking will be performed by the autonomous vehicles. In this case, an autonomous vehicle passes by a vehicle that has already stopped, but a person getting out of the stationary vehicle can't tell whether he/she has been recognized by the autonomous vehicle and determine whether he/she can walk in front of the autonomous vehicle.

In Japanese Unexamined Patent Application Publication No. 2003-327041, for example, when a sliding door of a vehicle is open, a light source unit of a light emission device directly radiates light downward from the sliding door. As a result, for example, a road surface is illuminated to attract attention from pedestrians and drivers of vehicles behind and beside.

In the technique disclosed in Japanese Unexamined Patent Application Publication No. 2003-327041, however, although a driver of a vehicle behind can recognize that a person is getting out since a road surface below a sliding door is illuminated, it is difficult, if the vehicle behind is an autonomous vehicle, for the autonomous vehicle to recognize that the person is getting out.

It can be difficult for an autonomous vehicle to recognize a person getting out of a vehicle ahead especially because the person can be hidden behind a vehicle body or a door.

A recognition result presentation apparatus according to an aspect of the present disclosure is a recognition result presentation apparatus that presents a result of recognition of a recognition target presented by a recognition target presentation apparatus in a moving direction of an autonomous moving body. The recognition result presentation apparatus includes a detector that detects, as the recognition target, a person appearance area, in which a person will appear, formed by the recognition target presentation apparatus on a road and a presenter that presents, to the person, a result of recognition indicating that the autonomous moving body has recognized the person appearance area as a result of the detection of the recognition target performed by the detector.

With this configuration, a person appearance area, in which a person will appear, formed by the recognition target presentation apparatus on a road is detected as a recognition target. A result of recognition indicating that an autonomous moving body has recognized the person appearance area as a result of the detection of the recognition target is presented to the person.

Since not the person but the person appearance area, in which a person will appear, formed by the recognition target presentation apparatus on the road is detected, it can be accurately recognized that the person will appear on the road. In addition, since the result of the recognition indicating that the autonomous moving body has recognized the person appearance area as a result of the detection of the recognition target is presented to the person, the person can be certainly notified that the autonomous moving body has recognized the place where the person will appear.

In addition, in the recognition result presentation apparatus, the presenter may include a light radiator that radiates light onto the person appearance area.

With this configuration, a person can be certainly notified, through light radiated onto a person appearance area, that an autonomous moving body has recognized the person appearance area.

In addition, in the recognition result presentation apparatus, the light radiator may radiate light having a same shape as the person appearance area onto the person appearance area and light having a linear shape onto ground between the person appearance area and the autonomous moving body.

With this configuration, a person can be certainly notified, through light having the same shape as a person appearance area radiated onto the person appearance area and light having a linear shape radiated onto the ground between the person appearance area and an autonomous moving body, that the autonomous moving body has recognized the person appearance area.

In addition, in the recognition result presentation apparatus, the light radiator may radiate light of a color different from a color of the person appearance area the person appearance area to change the color of the person appearance area.

With this configuration, a person who will appear in a person appearance area can understand that an autonomous moving body has recognized the person appearance area by seeing a change in the color of the person appearance area and determine how to act against the autonomous moving body, that is, whether to walk in front of the autonomous moving body.

In addition, in the recognition result presentation apparatus, the light radiator may project an image including a text indicating that the autonomous moving body has recognized the person appearance area onto the person appearance area.

With this configuration, a person can be certainly notified, through a text indicating that an autonomous moving body has recognized a person appearance area, that the autonomous moving body has recognized the person appearance area.

In addition, in the recognition result presentation apparatus, the light radiator may project an image including a pattern indicating that the autonomous moving body has recognized the person appearance area onto the person appearance area.

With this configuration, a person can be certainly notified, through a pattern indicating that an autonomous moving body has recognized a person appearance area, that the autonomous moving body has recognized the person appearance area.

In addition, in the recognition result presentation apparatus, the light radiator may radiate the light only within a part of the person appearance area across which the autonomous moving body will run.

With this configuration, since light is radiated only within a part of a person appearance area across which an autonomous moving body will run, a person who will appear in the person appearance area can understand an area across which the autonomous moving body will run, that is, an area recognized by the autonomous moving body.

In addition, in the recognition result presentation apparatus, the presenter may include a sound outputter that outputs a certain sound in a direction in which the person appearance area exists.

With this configuration, a person can be certainly notified, through a certain sound output in a direction in which a person appearance area exists, that an autonomous moving body has recognized the person appearance area.

In addition, the recognition result presentation apparatus may further include an image capturer that captures an image of a scene in the moving direction of the autonomous moving body. The detector may detect the person appearance area included in the image. The presenter may include a display that displays, on a front surface of the autonomous moving body, an image in which the person appearance area detected by the detector is indicated in a distinguishable manner.

With this configuration, an image of a scene in a moving direction of an autonomous moving body is captured. A person appearance area included in the image is detected. The display arranged on a front surface of the autonomous moving body displays an image in which the detected person appearance area is indicated in a distinguishable manner.

A person, therefore, can be certainly notified, through the image that is displayed on the display arranged on the front surface of the autonomous moving body and in which the detected person appearance area is indicated in a distinguishable manner, that the autonomous moving body has recognized the person appearance area.

In addition, in the recognition result presentation apparatus, the recognition target presentation apparatus may form the person appearance area by radiating, onto the road, light of a certain color detectable by the detector.

With this configuration, since the recognition target presentation apparatus forms a person appearance area by radiating, onto a road, light of a certain color detectable by the detector, an autonomous moving body can certainly recognize the person appearance area.

In addition, in the recognition result presentation apparatus, the recognition target presentation apparatus may form the person appearance area by radiating, onto the road, light having a certain pattern detectable by the first apparatus in the detecting.

With this configuration, since the recognition target presentation apparatus forms a person appearance area by radiating, onto a road, light having a certain pattern detectable by the detector, an autonomous moving body can certainly recognize the person appearance area.

In addition, in the recognition result presentation apparatus, the recognition target presentation apparatus may form the person appearance area by radiating, onto the road, temporally changing light detectable by the first apparatus in the detecting.

With this configuration, since the recognition target presentation apparatus forms a person appearance area by radiating, onto a road, temporally changing light detectable by the detector, an autonomous moving body can certainly recognize the person appearance area.

A method for presenting a result of recognition according to another aspect of the present disclosure is a method for presenting a result of recognition used in a recognition result presentation apparatus that presents a result of recognition of a recognition target presented by a recognition target presentation apparatus in a moving direction of an autonomous moving body. The method includes detecting, as the recognition target, a person appearance area, in which a person will appear, formed by the second apparatus on a road and presenting, to the person, a result of recognition indicating that the autonomous moving body has recognized the person appearance area as a result of the detecting.

With this configuration, a person appearance area, in which a person will appear, formed by the recognition target presentation apparatus on a road is detected as a recognition target. A result of recognition indicating that an autonomous moving body has recognized the person appearance area as a result of the detection of the recognition target is presented to the person.

Since not the person but the person appearance area, in which a person will appear, formed by the recognition target presentation apparatus on the road is detected, it can be accurately recognized that the person will appear on the road. In addition, since the result of the recognition indicating that the autonomous moving body has recognized the person appearance area as a result of the detection of the recognition target is presented to the person, the person can be certainly notified that the autonomous moving body has recognized the place where the person will appear.

A recognition target presentation apparatus according to another aspect of the present disclosure is a recognition target presentation apparatus that presents a recognition target recognizable by an autonomous moving body. The recognition target presentation apparatus includes an area formation determiner that determines whether to form a person appearance area, which is the recognition target and in which a person will appear, on a road and an area former that forms, if the area formation determiner determines that the person appearance area is to be formed, the person appearance area on the road.

With this configuration, whether to form a person appearance area, which is a recognition target and in which a person will appear, on a road is determined. If it is determined that a person appearance area is to be formed, the person appearance area is formed on the road.

Since the person appearance area, in which a person will appear, is formed on the road, therefore, an autonomous moving body can recognize that a person will appear by detecting the person appearance area formed on the road, even if it is difficult to directly detect the person.

A method for presenting a recognition target according to another aspect of the present disclosure is a method for presenting a recognition target used in a recognition target presentation apparatus that presents a recognition target recognizable by an autonomous moving body. The method includes determining whether to form a person appearance area, which is the recognition target and in which a person will appear, on a road and forming, if it is determined that the person appearance area is to be formed, the person appearance area on the road.

With this configuration, whether to form a person appearance area, which is a recognition target and in which a person will appear, on a road is determined. If it is determined that a person appearance area is to be formed, the person appearance area is formed on the road.

Since the person appearance area, in which a person will appear, is formed on the road, therefore, an autonomous moving body can recognize that a person will appear by detecting the person appearance area formed on the road, even if it is difficult to directly detect the person.

Embodiments of the present disclosure will be described hereinafter with reference to the accompanying drawings. The following embodiments are specific examples of the present disclosure and do not limit the technical scope of the present disclosure.

First Embodiment

FIG. 1 is a block diagram illustrating the configuration of an autonomous vehicle according to a first embodiment. An autonomous vehicle 1 illustrated in FIG. 1 includes an autonomous driving system 101, direction indicators 102, a vehicle control processor 103, a brake control system 104, an accelerator control system 105, a steering control system 106, a vehicle navigation system 107, and a global positioning system (GPS) 108.

The autonomous vehicle 1 is a vehicle that autonomously runs and is an example of an autonomous moving body. The autonomous vehicle 1 is an automobile in the first embodiment, but the present disclosure is not particularly limited to this. The autonomous vehicle 1 may be one of various vehicles such as a motorcycle, a truck, a bus, a train, and a flying object, instead.

The autonomous driving system 101 includes a processor 111, a memory 112, a user input unit 113, a presentation unit 114, and sensors 115.

The sensors 115 measure a surrounding environment and an internal environment of the autonomous vehicle 1. The sensor 115 include, for example, a speedometer that measures the traveling speed of the autonomous vehicle 1, an accelerometer that measures the acceleration of the autonomous vehicle 1, a gyroscope that measures the direction of the autonomous vehicle 1, and an engine temperature sensor. The sensors 115 are not limited to the above sensors.

The sensors 115 include a door open/close detection unit 31 and a camera 32.

The door open/close detection unit 31 detects whether each of doors of the autonomous vehicle 1 is open or closed.

The camera 32 is an example of an image capture unit and arranged near a rearview mirror of the autonomous vehicle 1. The camera 32 captures an image of a scene ahead of the autonomous vehicle 1. The camera 32 may capture not only an image of a scene ahead of the autonomous vehicle 1 but also images of surroundings of the autonomous vehicle 1, such as images of scenes behind, to the right, and to the left of the autonomous vehicle 1.

The memory 112 is a computer-readable recording medium such as a hard disk drive, a read-only memory (ROM), a random-access memory (RAM), an optical disc, or a semiconductor memory. The memory 112 stores an autonomous driving program 121 executed by the processor 111 and data 122 used by the processor 111.

The data 122 includes map data 21 and coordinate conversion map data 22. The map data 21 includes topographic information, lane information indicating driving lanes, intersection information indicating intersections, and speed limit information indicating speed limits. The map data 21 is not limited to the above pieces of information. The coordinate conversion map data 22 is a coordinate conversion map in which positions of pixels in an image captured by the camera 32 and positions in actual space are associated with each other.

The processor 111 is a central processing unit (CPU), for example, and executes the autonomous driving program 121 stored in the memory 112. The processor 111 executes the autonomous driving program 121, in order to cause the autonomous vehicle 1 to run autonomously. In addition, the processor 111 reads the data 122 from the memory 112, writes the data 122 to the memory 112, and updates the data 122 stored in the memory 112.

The autonomous driving program 121 causes the processor 111 to function as a lane detection unit 11, an area formation determination unit 12, an area detection unit 13, and a coordinate conversion unit 14.

The lane detection unit 11 recognizes lane-dividing lines on a road in an image captured by the camera 32 and detects a lane in which the autonomous vehicle 1 is running.

The area formation determination unit 12 determines whether to form a person appearance area, which indicates a position at which a person will appear, on a road. If the door open/close detection unit 31 detects that a door of the autonomous vehicle 1 is open, the area formation determination unit 12 determines that a person appearance area is to be formed.

The area detection unit 13 detects, in an image captured by the camera 32, a person appearance area, in which a person will appear, formed by an area radiation section 41 on a road as a recognition target. The area detection unit 13 learns a neural network having a multilayer structure through deep learning, and detects a person appearance area included in a captured image by inputting the captured image to the neutral network.

The coordinate conversion unit 14 converts coordinates in a captured image into coordinates in actual space using the coordinate conversion map data 22.

The user input unit 113 receives various pieces of information from a user. The user input unit 113 includes, for example, buttons or a touch panel.

The presentation unit 114 presents various pieces of information. If the area formation determination unit 12 determines that a person appearance area is to be formed, the presentation unit 114 forms the person appearance area on a road. In addition, if the area detection unit 13 detects a person appearance area (recognition target), the presentation unit 114 presents, to a person, a result of recognition indicating that the autonomous vehicle 1 has recognized the person appearance area. The presentation unit 114 includes area radiation sections 41 and a laser emission section 42.

The area radiation sections 41 are arranged in a lower part of the autonomous vehicle 1 under doors. Each of the area radiation sections 41 is arranged for one of the doors of the autonomous vehicle 1. If the area formation determination unit 12 determines that a person appearance area is to be formed, a corresponding one of the area radiation sections 41 radiates light having a certain shape onto a road under a door that is open, in order to form the person appearance area on the road. The person appearance area is, for example, rectangular. An area radiation section 41 of a recognition target presentation apparatus radiates light of a certain color detectable by the area detection unit 13 onto a road to form a person appearance area.

The laser emission section 42 is arranged in a front part of the autonomous vehicle 1 and emits laser light to a person appearance area ahead of the autonomous vehicle 1. The laser emission section 42 may emit laser light not only to a person appearance area ahead of the autonomous vehicle 1 but also to person appearance areas around the autonomous vehicle 1, such as person appearance areas behind, to the right, and to the left of the autonomous vehicle 1. The laser emission section 42 preferably emits laser light having the same shape as a person appearance area to the person appearance area and laser light having a linear shape onto the ground between the person appearance area and the autonomous vehicle 1.

The laser emission section 42 emits laser light to a position of a person appearance area converted by the coordinate conversion unit 14 into coordinates in actual space. If the area detection unit 13 identifies a direction of a person appearance area and a distance between the autonomous vehicle 1 and the person appearance area, the laser emission section 42 may emit laser light to the ground at the position of the person appearance area.

The laser emission section 42 emits laser light of a color different from a color of a person appearance area to the person appearance area to change the color of the person appearance area. If a person appearance area is green and light emitted by the laser emission section 42 is red, the person appearance area turns yellow when the laser emission section 42 emits the light to the person appearance area. A person getting out of a stationary autonomous vehicle 1, therefore, can understand that an approaching autonomous vehicle 1 has recognized a person appearance area by taking a look at the person appearance area whose color has changed from green to yellow.

The direction indicators 102 are devices for indicating a direction in which the autonomous vehicle 1 is turning. The vehicle control processor 103 controls the autonomous vehicle 1. The brake control system 104 slows down the autonomous vehicle 1. The accelerator control system 105 accelerates the autonomous vehicle 1. The steering control system 106 adjusts a direction in which the autonomous vehicle 1 travels. The vehicle navigation system 107 determines and displays a route of the autonomous vehicle 1. The GPS 108 obtains a current position of the autonomous vehicle 1.

The processor 111 controls the direction and speed of the autonomous vehicle 1 on the basis of results of sensing performed by the sensors 115, a result of detection performed by the lane detection unit 11, and a result of detection performed by the area detection unit 13. The processor 111 accelerates the autonomous vehicle 1 using the accelerator control system 105, slows down the autonomous vehicle 1 using the brake control system 104, and changes the direction of the autonomous vehicle 1 using the steering control system 106.

If the area detection unit 13 detects a person appearance area, the processor 111 controls the autonomous vehicle 1 such that the autonomous vehicle 1 avoids the person appearance area or stops before the person appearance area.

Figure 2:
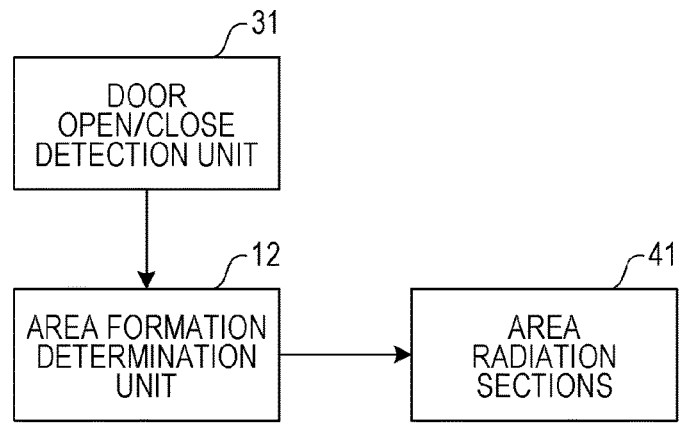
FIG. 2 is a diagram illustrating a recognition target presentation apparatus according to the first embodiment.

FIG. 2 is a diagram illustrating the configuration of the recognition target presentation apparatus according to the first embodiment. The recognition target presentation apparatus presents a recognition target recognizable by the autonomous vehicle 1 (autonomous moving body). The recognition target presentation apparatus illustrated in FIG. 2 includes the area formation determination unit 12, the door open/close detection unit 31, and the area radiation sections 41. The same components of the recognition target presentation apparatus illustrated in FIG. 2 as those illustrated in FIG. 1 are given the same reference numerals, and description thereof is omitted.

Figure 3:
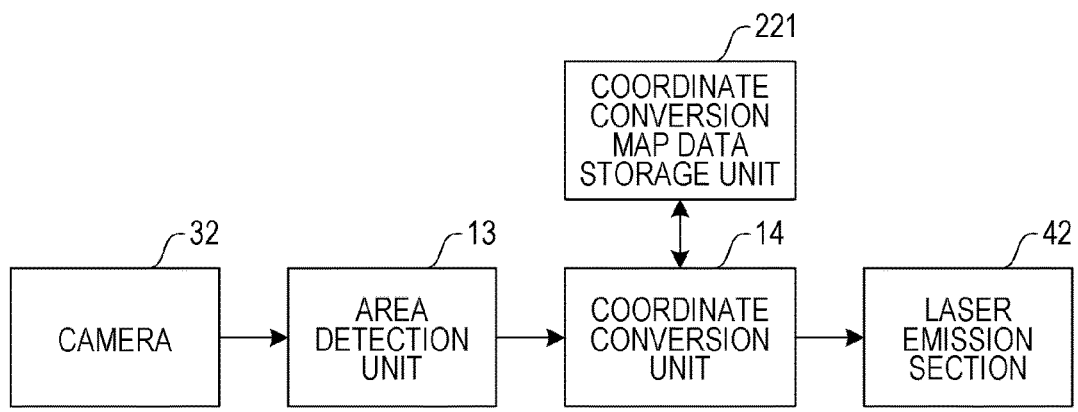
FIG. 3 is a diagram illustrating the configuration of a recognition result presentation apparatus according to the first embodiment.

FIG. 3 is a diagram illustrating the configuration of a recognition result presentation apparatus according to the first embodiment. The recognition result presentation apparatus presents a result of recognition of a recognition target presented by the recognition target presentation apparatus in a moving direction of the autonomous vehicle 1 (autonomous moving body). The recognition result presentation apparatus illustrated in FIG. 3 includes the camera 32, the area detection unit 13, the coordinate conversion unit 14, the laser emission section 42, and a coordinate conversion map data storage unit 221.

The same components of the recognition result presentation apparatus illustrated in FIG. 3 as those illustrated in FIG. 1 are given the same reference numerals, and description thereof is omitted. The coordinate conversion map data storage unit 221 includes the memory 112 illustrated in FIG. 1 and stores the coordinate conversion map data 22.

Next, the operation of the recognition target presentation apparatus according to the first embodiment will be described.

Figure 4:
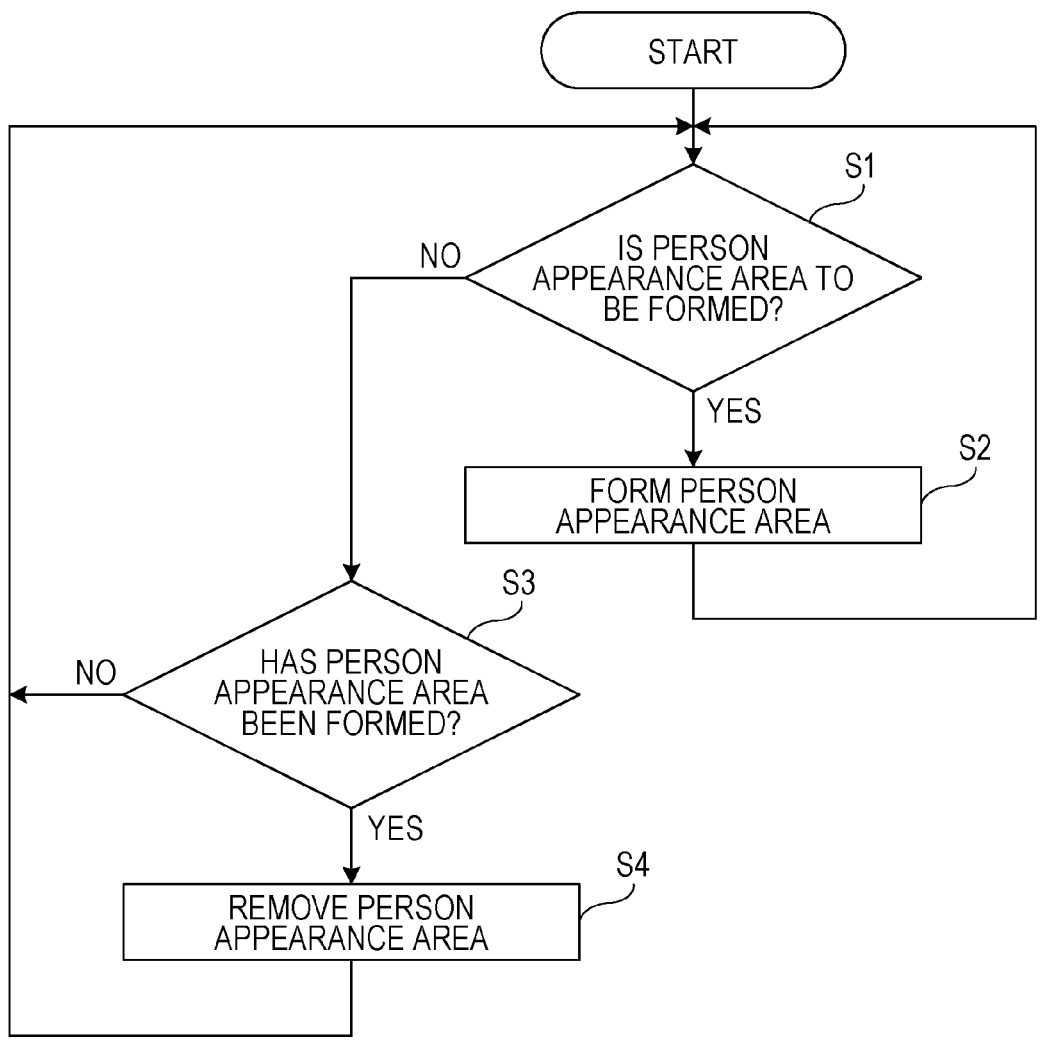
FIG. 4 is a flowchart illustrating the operation of the recognition target presentation apparatus according to the first embodiment.

FIG. 4 is a flowchart illustrating the operation of the recognition target presentation apparatus according to the first embodiment.

First, in step S1, the area formation determination unit 12 determines whether to form a person appearance area, in which a person will appear, by radiating light onto a road. If the door open/close detection unit 31 detects that a door of the autonomous vehicle 1 is open, the area formation determination unit 12 determines that a person appearance area is to be formed. If the door open/close detection unit 31 detects that the doors of the autonomous vehicle 1 are closed, the area formation determination unit 12 determines that a person appearance area is not to be formed.

If the area formation determination unit 12 determines that a person appearance area is to be formed (YES in step S1), a corresponding one of the area radiation sections 41, in step S2, radiates light having a rectangular shape, for example, onto a road below the door that is open to form a person appearance area on the road. The process then returns to step S1.

On the other hand, if the area formation determination unit 12 determines that a person appearance area is not to be formed (NO in step S1), the area radiation sections 41, in step S3, determine whether a person appearance area has been formed. That is, if at least one of the area radiation sections 41 has radiated light having a rectangular shape onto the road below a corresponding one of the doors, the area radiation sections 41 determine that a person appearance area has been formed. If not, the area radiation sections 41 determine that a person appearance area has not been formed.

If the area radiation sections 41 determine that a person appearance area has not been formed (NO in step S3), the process returns to step S1.

On the other hand, if the area radiation sections 41 determine that a person appearance area has been formed (YES in step S3), a corresponding one of the area radiation sections 41, in step S4, stops radiating the rectangular light pattern onto the road below the corresponding one of the doors to remove the person appearance area. The process then returns to step S1.

Figure 5:
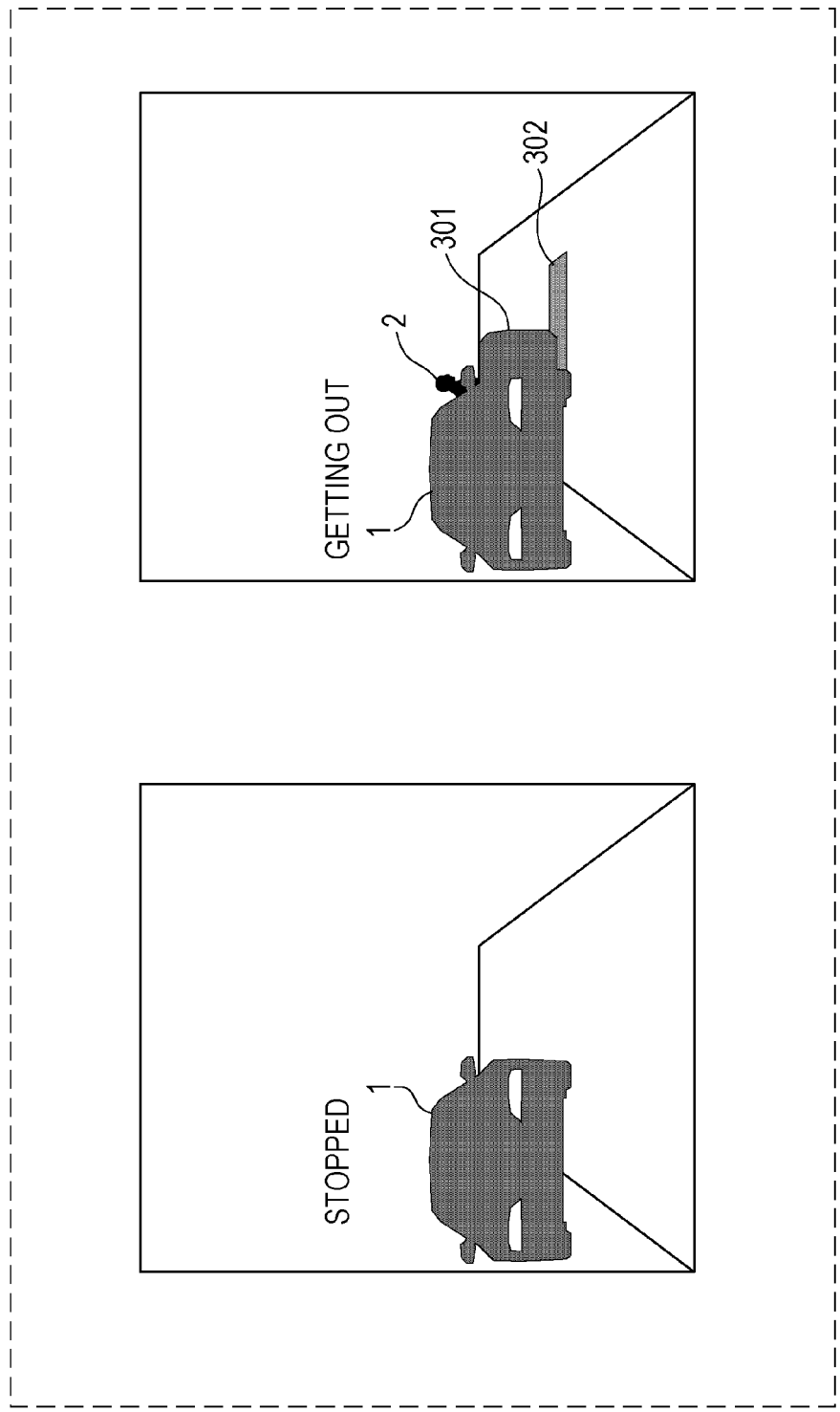
FIG. 5 is a schematic diagram illustrating formation of a person appearance area according to the first embodiment.

FIG. 5 is a schematic diagram illustrating the formation of a person appearance area according to the first embodiment. As illustrated in FIG. 5, when the autonomous vehicle 1 stops at an edge of a road and a person 2 gets out of the autonomous vehicle 1 through a door 301, a corresponding one of the area radiation sections 41 radiates light having a rectangular shape, for example, onto the road below the door 301 to form a person appearance area 302 on the road.

Next, the operation of the recognition result presentation apparatus according to the first embodiment will be described.

Figure 6:
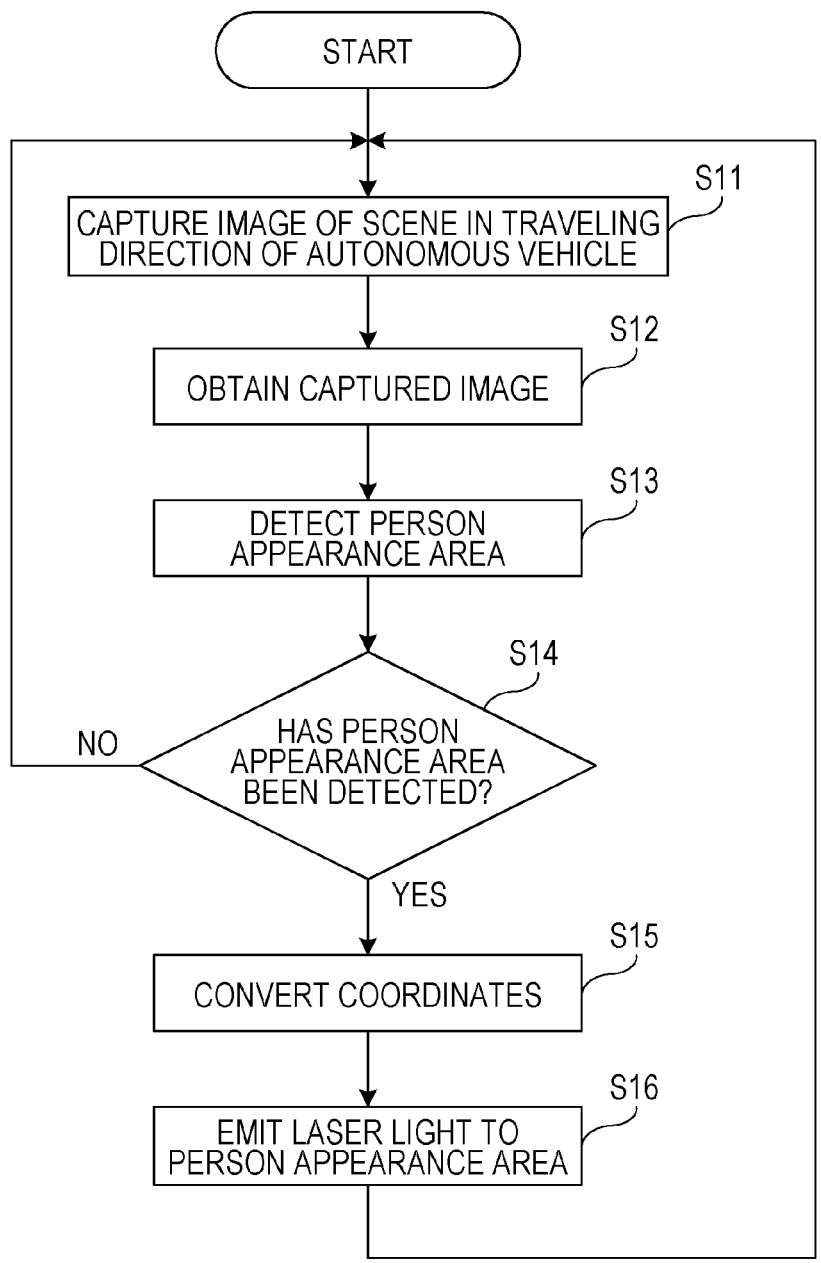
FIG. 6 is a flowchart illustrating the operation of the recognition result presentation apparatus according to the first embodiment.
Figure 7:
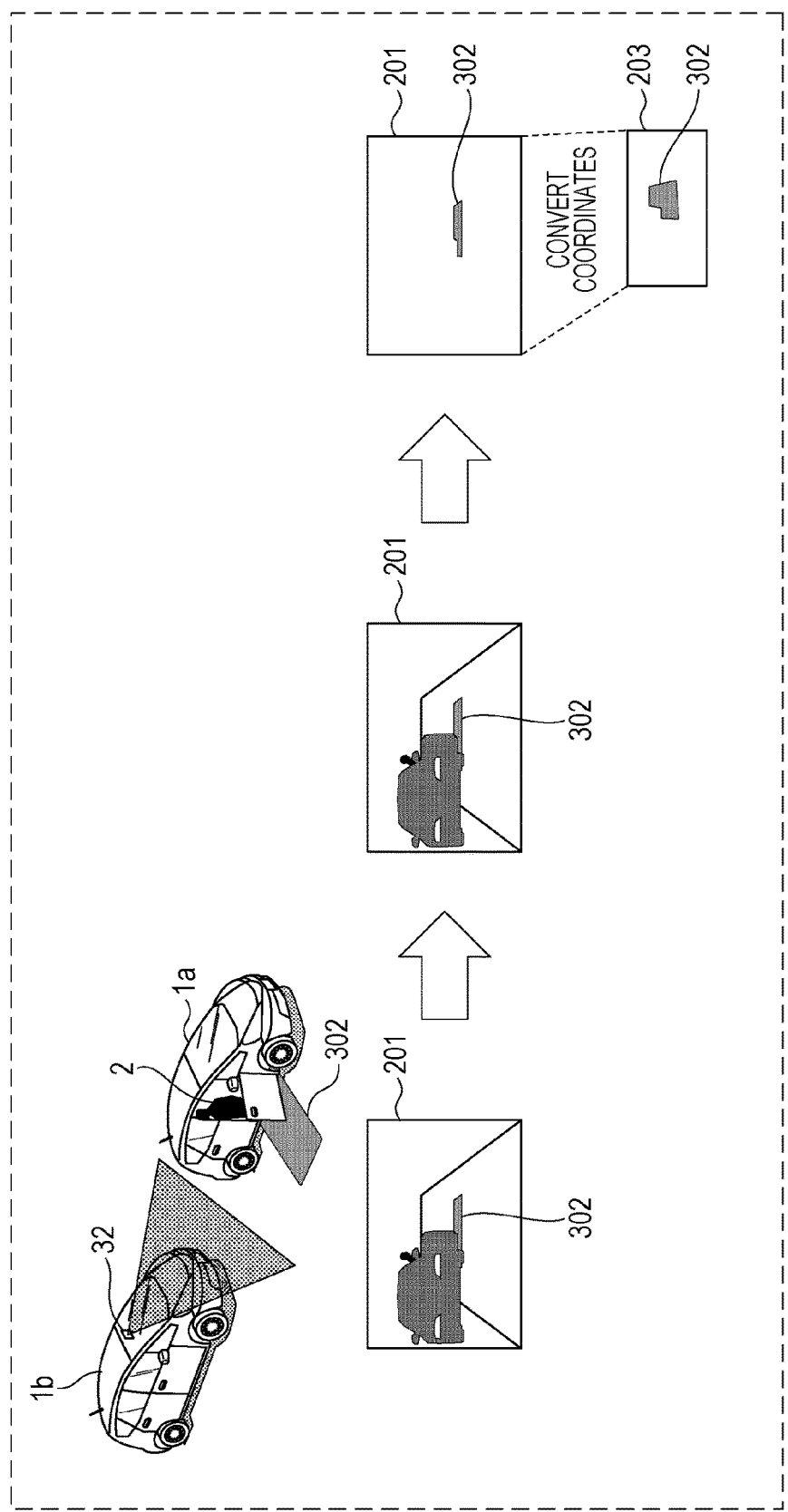
FIG. 7 is a schematic diagram illustrating capture of an image, detection of a person appearance area, and conversion of coordinates in the captured image according to the first embodiment.

FIG. 6 is a flowchart illustrating the operation of the recognition result presentation apparatus according to the first embodiment. FIG. 7 is a schematic diagram illustrating capture of an image, detection of a person appearance area, and conversion of coordinates in the captured image according to the first embodiment. In the following description, a stationary autonomous vehicle of which a person is getting out will be referred to as an "autonomous vehicle 1*a*", and an autonomous vehicle approaching the stationary autonomous vehicle 1*a* from behind will be referred to as an "autonomous vehicle 1*b*".

First, in step S11, the camera 32 captures an image 201 of a scene in a moving direction of the autonomous vehicle 1*b*. In this case, the camera 32 is arranged at a position at which the camera 32 can capture an image of a scene ahead of the autonomous vehicle 1*b*. When the autonomous vehicle 1*b* is moving forward, it is preferable to use a camera provided in a front part of the autonomous vehicle 1*b*, and when the autonomous vehicle 1*b* is moving backward, it is preferable to use a camera provided in a rear part of the autonomous vehicle 1*b*.

Next, in step S12, the area detection unit 13 obtains the image 201 captured by the camera 32. The captured image 201 illustrated in FIG. 7 includes the person appearance area 302.

Next, in step S13, the area detection unit 13 detects a person appearance area included in the captured image 201 obtained from the camera 32. In FIG. 7, the area detection unit 13 detects the person appearance area 302 included in the captured image 201.

Next, in step S14, the coordinate conversion unit 14 determines whether the area detection unit 13 has detected a person appearance area from the captured image 201. If the coordinate conversion unit 14 determines that a person appearance area has not been detected (NO in step S14), the process returns to step S11.

On the other hand, if the coordinate conversion unit 14 determines that a person appearance area has been detected (YES in step S14), the coordinate conversion unit 14, in step S15, converts coordinates in the captured image 201 into coordinates in actual space using the coordinate conversion map data 22. As illustrated in FIG. 7, the coordinate conversion unit 14 converts the coordinates in the captured image 201 to generate an actual space image 203 corresponding to the coordinates in actual space.

Next, in step S16, the laser emission section 42 emits laser light to the person appearance area 302 detected by the area detection unit 13. At this time, the laser emission section 42 identifies an actual position of the person appearance area 302 on the basis of a coordinate position of the person appearance area 302 in the actual space image 203 obtained as a result of the conversion performed by the coordinate conversion unit 14 and emits laser light to the identified actual position. The process then returns to step S11.

The processing in steps S11 to S16 continues while the autonomous vehicle 1b is on.

Figure 8:
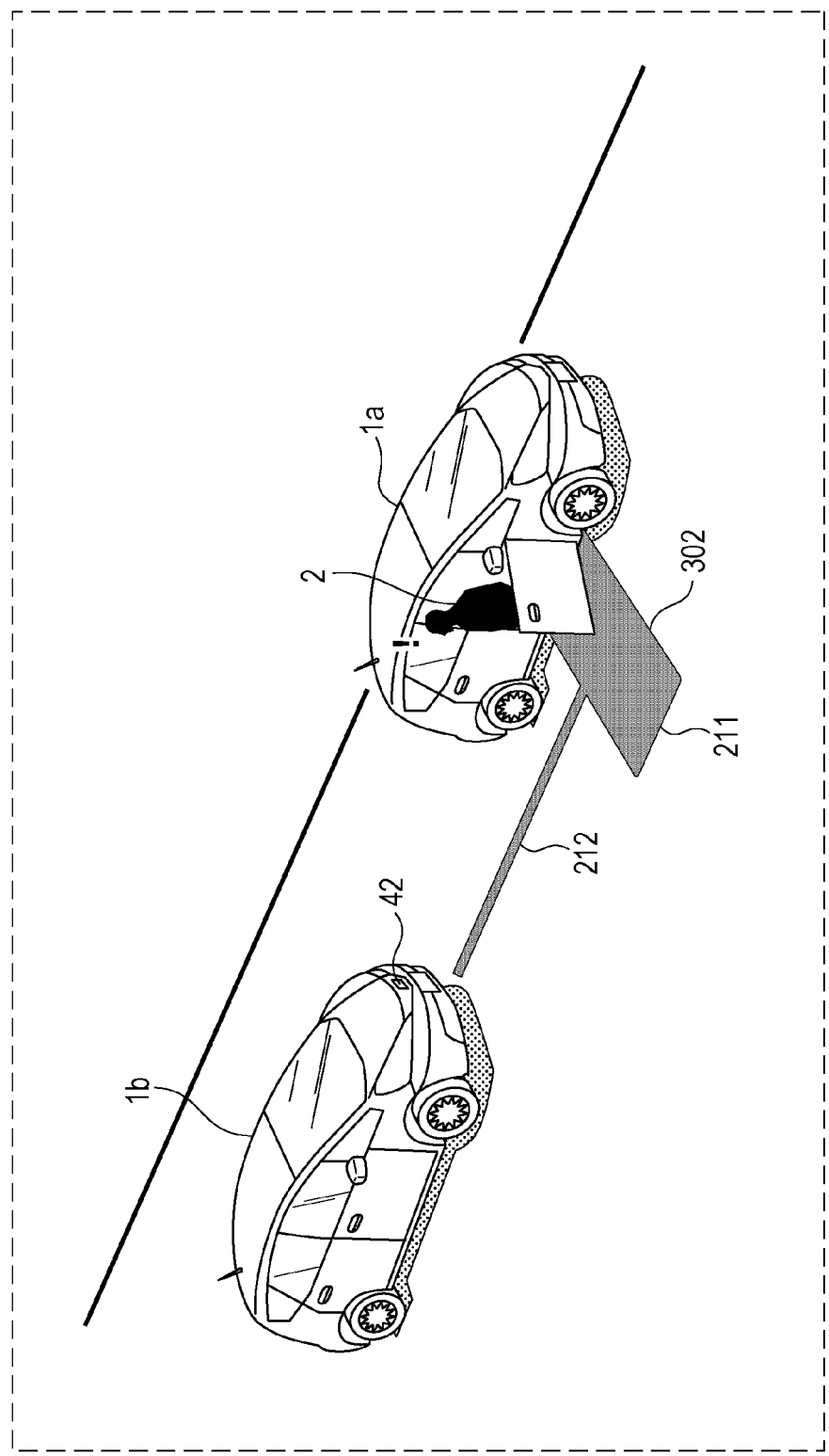
FIG. 8 is a diagram illustrating a process for presenting a result of recognition according to the first embodiment.

FIG. 8 is a diagram illustrating a process for presenting a result of recognition according to the first embodiment. As illustrated in FIG. 8, if the person appearance area 302 is detected, the laser emission section 42 emits laser light 211 having the same shape as the person appearance area 302 to the detected person appearance area 302 and laser light 212 having a linear shape on the ground between the person appearance area 302 and the autonomous vehicle 1b. The person 2, therefore, can understand whether the autonomous vehicle 1b has recognized the person appearance area 302 under his/her feet and determine how to act against the autonomous vehicle 1b, that is, whether to walk in front of the autonomous vehicle 1b. Since the laser light 212 having a linear shape is emitted to the ground between the person appearance area 302 and the autonomous vehicle 1b, the person 2 can easily understand which autonomous vehicle has recognized the person appearance area 302 under his/her feet.

Although laser light is emitted to the person appearance area 302 in the first embodiment, the present disclosure is not particularly limited to this. Light from another light source, such as a light-emitting diode, may be radiated onto the person appearance area 302, instead.

The presentation unit 114 may include a projector and radiate light (an image) from the projector onto the person appearance area 302. In this case, the projector preferably radiates light having a linear shape onto the ground between the projector and the person appearance area 302.

Figure 9:
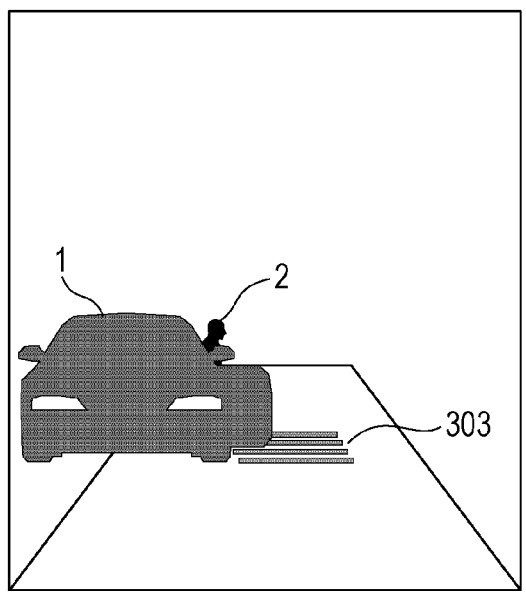
FIG. 9 is a diagram illustrating a process for presenting a recognition target according to a first modification of the first embodiment.

FIG. 9 is a diagram illustrating a process for presenting a recognition target according to a first modification of the first embodiment.

In the first embodiment, one of the area radiation sections 41 forms the person appearance area 302 by radiating, onto a road, light of a certain color detectable by the area detection unit 13. In the first modification of the first embodiment, however, one of the area radiation sections 41 forms a person appearance area 303 by radiating, onto a road, light having a certain pattern detectable by the area detection unit 13. That is, as illustrated in FIG. 9, one of the area radiation sections 41 forms the person appearance area 303 detectable by the area detection unit 13 by radiating striped light onto a road. The area detection unit 13 can easily detect the person appearance area 303 by recognizing a striped part of a captured image.

In addition, in the first embodiment, one of the area radiation sections 41 may form a person appearance area by radiating temporally changing light detectable by the area detection unit 13 onto a road, instead. That is, one of the area radiation sections 41 may form a person appearance area detectable by the area detection unit 13 by radiating light having a certain shape and a certain color onto a road and flashing the light at certain time intervals. Alternatively, one of the area radiation sections 41 may form a person appearance area detectable by the area detection unit 13 by radiating light having a certain shape and a certain color onto a road and intermittently turning off the light.

Furthermore, one of the area radiation sections 41 may form a person appearance area detectable by the area detection unit 13 by radiating light having a certain shape and a certain color onto a road and changing a pattern of the radiated light at certain time intervals, instead. Alternatively, one of the area radiation sections 41 may form a person appearance area detectable by the area detection unit 13 by radiating light having a certain shape onto a road and changing the color of the radiated light at certain time intervals.

In addition, in the first embodiment, one of the area radiation sections 41 may form a person appearance area by radiating light other than visible light detectable by the area detection unit 13 onto a road, instead. The light other than visible light is, for example, infrared light. In this case, the area detection unit 13 may detect the person appearance area by detecting the light other than visible light included in a captured image.

In addition, in the first embodiment, the autonomous vehicle 1 may further include a speaker that outputs a sound indicating that a person will appear and a microphone that collects a sound indicating that a person will appear.

Figure 10:
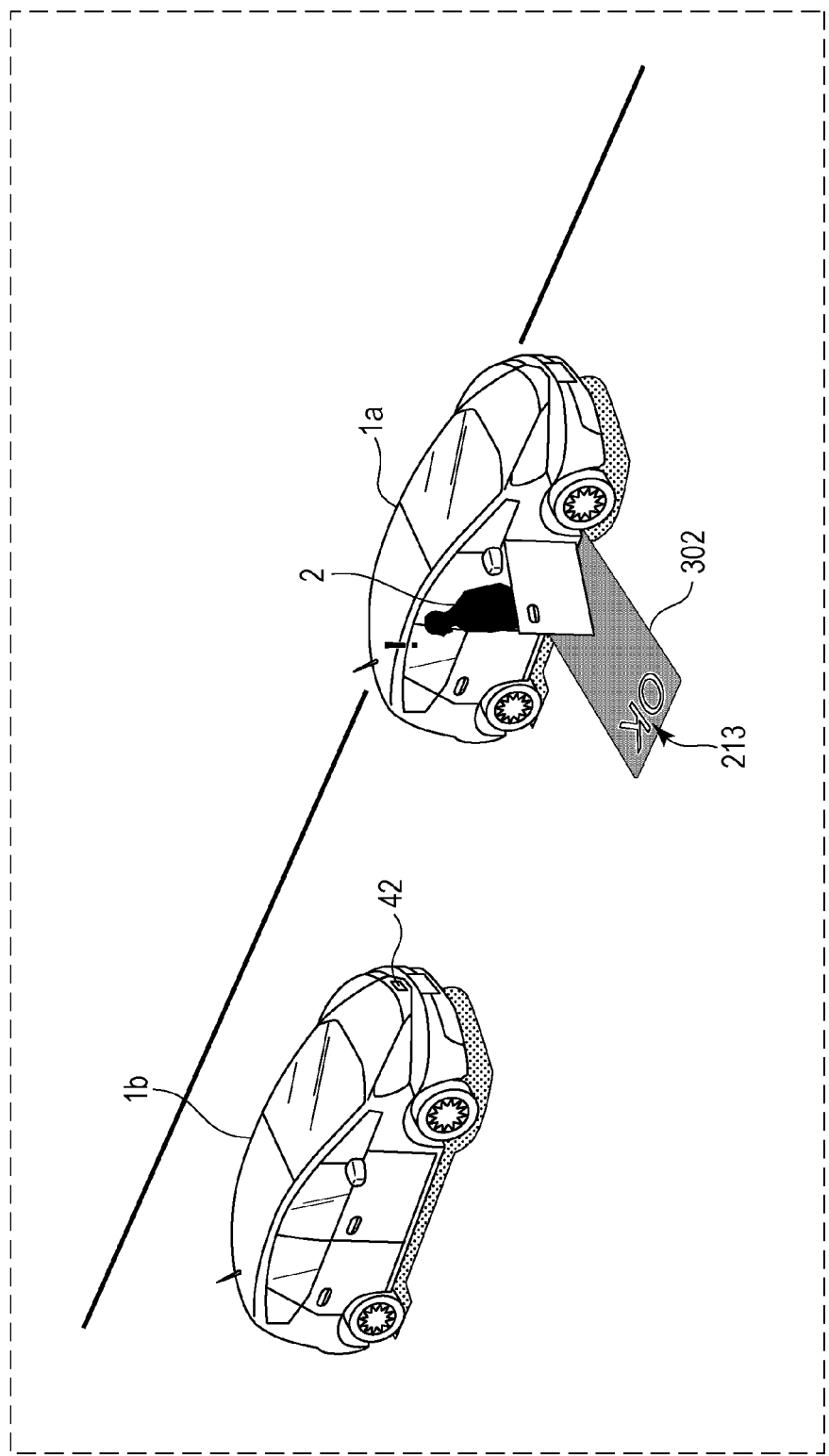
FIG. 10 is a diagram illustrating a process for presenting a result of recognition according to a second modification of the first embodiment.

FIG. 10 is a diagram illustrating a process for presenting a result of recognition according to a second modification of the first embodiment.

In the second modification of the first embodiment, the laser emission section 42 projects, onto a person appearance area, an image including a text indicating that the autonomous vehicle 1b has recognized the person appearance area. As illustrated in FIG. 10, the laser emission section 42 projects an image including a text 213, namely "OK", for example, onto the person appearance area 302. As a result, the text 213, namely "OK", is shown in the person appearance area 302, and the person 2 can understand that the autonomous vehicle 1b has recognized the person appearance area 302 by taking a look at the text 213. The person 2, therefore, can determine how to act against the autonomous vehicle 1b, that is, whether to walk in front of the autonomous vehicle 1b.

The text projected onto the person appearance area 302 is not limited to "OK" illustrated in FIG. 10. Any text indicating that the autonomous vehicle 1b has recognized the person appearance area 302 may be projected, instead. Alternatively, a sign, a figure, or a drawing may be projected onto the person appearance area 302 instead of a text.

Figure 11:
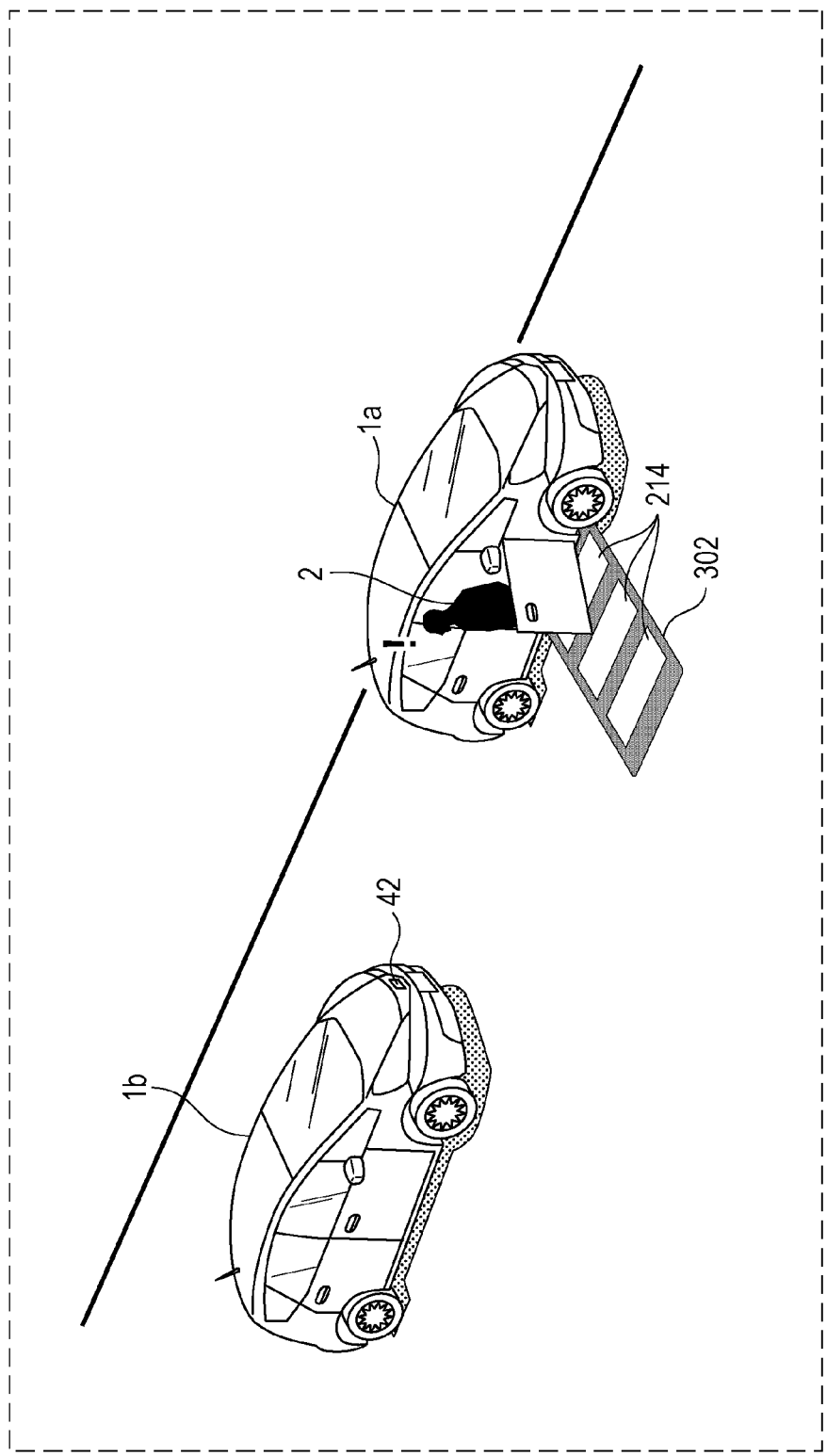
FIG. 11 is a diagram illustrating a process for presenting a result of recognition according to a third modification of the first embodiment.

FIG. 11 is a diagram illustrating a process for presenting a result of recognition according to a third modification of the first embodiment.

In the third modification of the first embodiment, the laser emission section 42 projects, onto a person appearance area, an image including a pattern indicating that the autonomous vehicle 1b has recognized the person appearance area. As illustrated in FIG. 11, the laser emission section 42 projects an image including a pattern 214 indicating a crosswalk, for example, onto the person appearance area 302. As a result, the pattern 214 indicating a crosswalk is shown in the person appearance area 302, and the person 2 can understand that the autonomous vehicle 1b has recognized the person appearance area 302 by taking a look at the pattern 214. The person 2, therefore, can determine how to act against the autonomous vehicle 1b, that is, whether to walk in front of the autonomous vehicle 1b.

The pattern projected onto the person appearance area 302 is not limited to the crosswalk illustrated in FIG. 11. Any pattern indicating that the autonomous vehicle 1b has recognized the person appearance area 302 may be projected.

Figure 12:
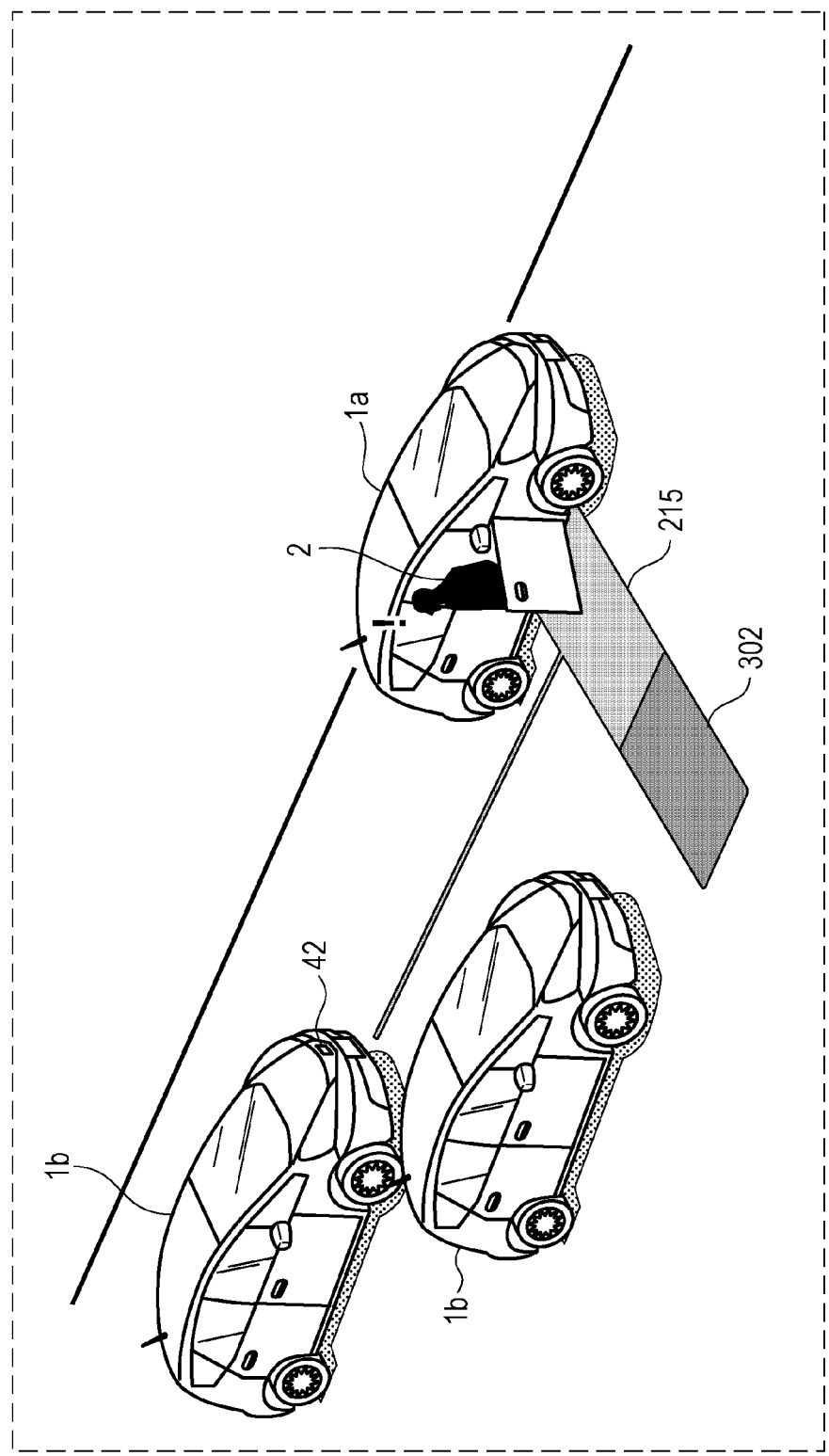
FIG. 12 is a diagram illustrating a process for presenting a result of recognition according to a fourth modification of the first embodiment.

FIG. 12 is a diagram illustrating a process for presenting a result of recognition according to a fourth modification of the first embodiment.

In the fourth modification of the first embodiment, the laser emission section 42 radiates light only within a part of a person appearance area across which the autonomous vehicle 1b will run. As illustrated in FIG. 12, the laser emission section 42 radiates light only within a part 215 of the rectangular person appearance area 302 across which the autonomous vehicle 1b will run. As a result, the color of the part 215 of the person appearance area 302 across which the autonomous vehicle 1b will run changes. The person 2, therefore, can learn the part 215 across which the autonomous vehicle 1b will run, that is, an area recognized by the autonomous vehicle 1b.

Figure 13:
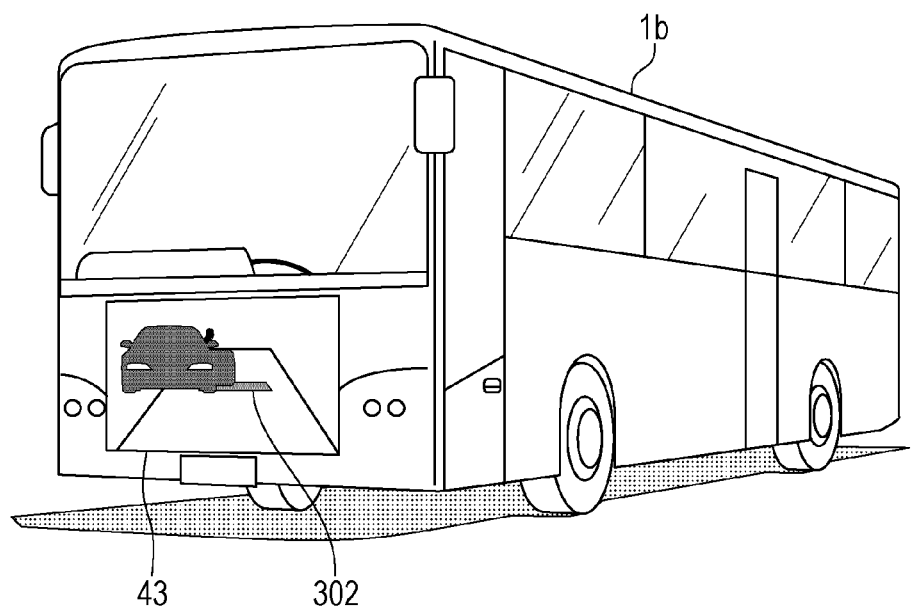
FIG. 13 is a diagram illustrating a process for presenting a result of recognition according to a fifth modification of the first embodiment.

FIG. 13 is a diagram illustrating a process for presenting a result of recognition according to a fifth modification of the first embodiment.

In a fifth modification of the first embodiment, a recognition result presentation apparatus includes a display section 43 that is arranged on a front surface of the autonomous vehicle 1b and that displays an image indicating a person appearance area detected by the area detection unit 13 in a distinguishable manner, instead of the coordinate conversion unit 14, the coordinate conversion map data storage unit 221, and the laser emission section 42.

As illustrated in FIG. 13, the display section 43 is a liquid crystal display device, for example, and arranged on the front surface of the autonomous vehicle 1b. The display section 43 is arranged at least on any of the front surface, a back surface, a right surface, and a left surface of the autonomous vehicle 1b. The area detection unit 13 detects the person appearance area 302 included in the captured image 201. The display section 43 displays the detected person appearance area 302 such that the color of the displayed person appearance area 302 becomes different from an actual color. The display section 43 displays in real time an image in which the color of the detected person appearance area 302 is different from the actual color. The person 2, therefore, can understand whether the autonomous vehicle 1b has recognized the person appearance area 302 and determine how to act against the autonomous vehicle 1b, that is, whether to walk in front of the autonomous vehicle 1b.

The display section 43 preferably displays a laterally reversed image. In this case, the person appearance area 302 is displayed as if in a mirror, and the person 2 can intuitively understand a result of recognition.

Figure 14:
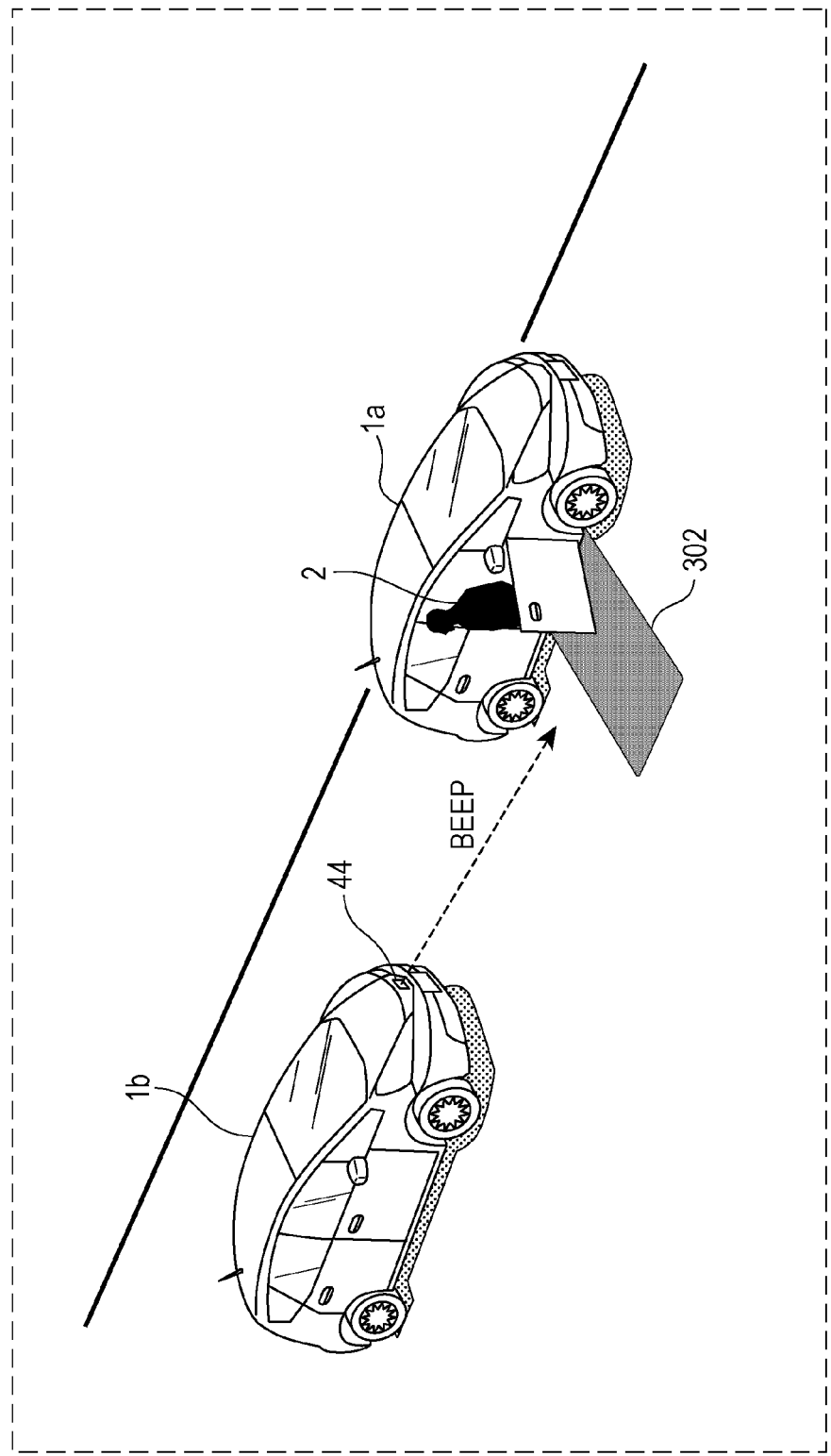
FIG. 14 is a diagram illustrating a process for presenting a result of recognition according to a sixth modification of the first embodiment.

FIG. 14 is a diagram illustrating a process for presenting a result of recognition according to a sixth modification of the first embodiment.

In the sixth modification of the first embodiment, the recognition result presentation apparatus includes a sound output section 44 that outputs a certain sound in a direction in which a person appearance area exists, instead of the coordinate conversion unit 14, the coordinate conversion map data storage unit 221, and the laser emission section 42.

As illustrated in FIG. 14, the sound output section 44 is a directional speaker, for example, and outputs a certain sound having directivity in a direction in which a detected person appearance area exists. Since a sound output from the sound output section 44 has directivity, only the person 2 can hear the sound. The person 2, therefore, can understand whether the autonomous vehicle 1b has recognized the person appearance area 302 and determine how to act against the autonomous vehicle 1b, that is, whether to walk in front of the autonomous vehicle 1b.

Although the recognition target presentation apparatus forms a person appearance area on a road under the feet of a person who is getting out of the autonomous vehicle 1a in the first embodiment, the present disclosure is not particularly limited to this. For example, the recognition target presentation apparatus may form a person appearance area on a road under the feet of a person who is going out of a building around an intersection or the like, instead.

Figure 15:
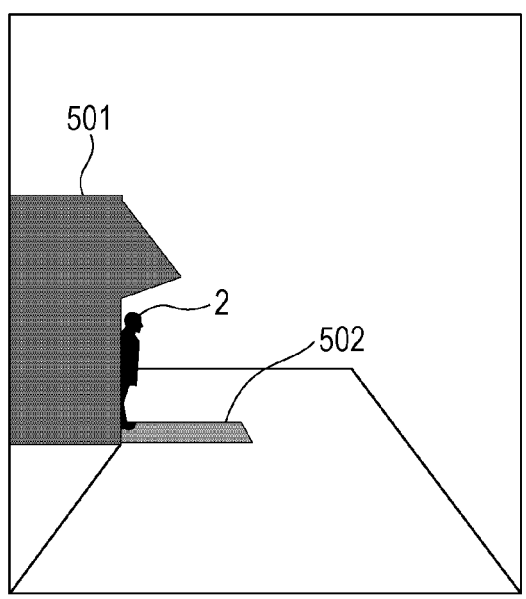
FIG. 15 is a diagram illustrating a process for presenting a result of recognition according to a seventh modification of the first embodiment.

FIG. 15 is a diagram illustrating a process for presenting a recognition target according to a seventh modification of the first embodiment. In the seventh modification of the first embodiment, the door open/close detection unit 31 of the recognition target presentation apparatus detects whether a door at an entrance of a building 501 is open or closed.

If the door open/close detection unit 31 detects that the door of the building 501 is open, the area formation determination unit 12 determines that a person appearance area 502 is to be formed. If the door open/close detection unit 31 detects that the door of the building 501 is closed, the area formation determination unit 12 determines that the person appearance area 502 is not to be formed.

An area radiation section 41 is provided at the entrance of the building 501 and radiates light having a rectangular shape, for example, onto a road under the open door to form the person appearance area 502 on the road. The area detection unit 13 of the autonomous vehicle 1 then detects the person appearance area 502 included in the image 201 captured by the camera 32. The laser emission section 42 emits laser light to the person appearance area 502 detected by the area detection unit 13.

The person appearance area 502 can thus be formed under the feet of not a person getting out of a vehicle but a person getting out of a building, in order to cause the autonomous vehicle 1 to recognize the person appearance area 502. The person 2, therefore, can understand whether the autonomous vehicle 1 has recognized the person appearance area 502 and determine how to act against the autonomous vehicle 1, that is, whether to walk in front of the autonomous vehicle 1.

Alternatively, the area detection unit 13 may detect a plurality of person appearance areas in a captured image. If a plurality of person appearance areas are detected, the laser emission section 42 may radiate light onto the plurality of detected person appearance areas. Alternatively, if a plurality of person appearance areas are detected, the display section 43 may display an image in which the plurality of detected person appearance areas have different colors. Alternatively, if a plurality of person appearance areas are detected, the sound output section 44 may output a sound for each of the plurality of detected person appearance areas.

In addition, in the first embodiment, the presentation unit 114 may include at least one of the laser emission section 42, the display section 43, and the sound output section 44. That is, two or all of presentation of a result of recognition performed by the laser emission section 42, presentation of a result of recognition performed by the display section 43, and presentation of a result of recognition performed by the sound output section 44 may be combined with each other.

In addition, although a vehicle of which a person is getting out is an autonomous vehicle in the first embodiment, the present disclosure is not particularly limited to this. The vehicle of which a person is getting out may be a vehicle operated by a driver, instead. It is sufficient that the vehicle is provided with the recognition target presentation apparatus.

In addition, although the area formation determination unit 12 determines that a person appearance area is to be formed if the door open/close detection unit 31 detects that a door is open in the first embodiment, the present disclosure is not particularly limited to this. The area formation determination unit 12 may determine that a person appearance area is to be formed if it is detected that an autonomous vehicle is off, instead.

In addition, in the first embodiment, if the door open/close detection unit 31 detects that a door is closed after the door open/close detection unit 31 detects that the door is open and the area formation determination unit 12 determines that a person appearance area is to be formed, the area formation determination unit 12 may determine that a person appearance area is to remain formed until a certain period of time elapses after the door open/close detection unit 31 detects that the door is closed, instead. As a result, the person appearance area remains formed until the certain period of time elapses after the door is closed, and a person can safely walk in front of the autonomous vehicle 1*b*.

Second Embodiment

Figure 16:
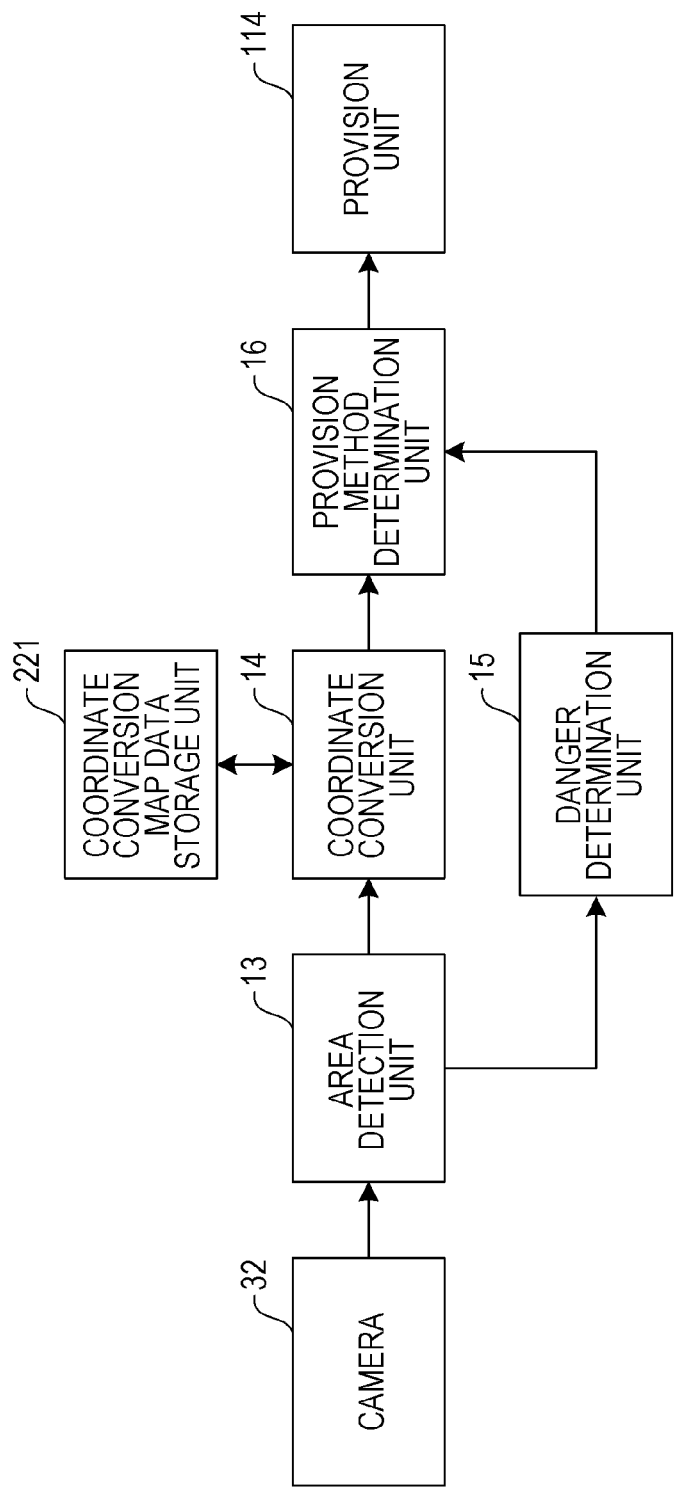
FIG. 16 is a diagram illustrating the configuration of a recognition result presentation apparatus according to a second embodiment.

FIG. 16 is a diagram illustrating the configuration of a recognition result presentation apparatus according to a second embodiment. The recognition result presentation apparatus illustrated in FIG. 16 includes the camera 32, the area detection unit 13, the coordinate conversion unit 14, a danger determination unit 15, a presentation method determination unit 16, the presentation unit 114, and the coordinate conversion map data storage unit 221.

The configuration of an autonomous vehicle according to the second embodiment is the same as that of the autonomous vehicle 1 illustrated in FIG. 1 except that the autonomous vehicle according to the second embodiment further includes the danger determination unit 15 and the presentation method determination unit 16 in the autonomous driving program 121. The same components of the recognition result presentation apparatus illustrated in FIG. 16 as those illustrated in FIG. 1 or 3 are given the same reference numerals, and description thereof is omitted.

The danger determination unit 15 determines a degree of danger in a person appearance area detected by the area detection unit 13. The degree of danger is either a first degree of danger or a second degree of danger, which is lower than the first degree of danger. The danger determination unit 15 estimates a distance between the autonomous vehicle 1 and a person appearance area, for example, on the basis of a captured image, and if the estimated distance is equal to or smaller than a certain distance, the danger determination unit 15 determines that the degree of danger is the first degree of danger, which means that the person appearance area is dangerous. If the estimated distance is larger than the certain distance, the danger determination unit 15 determines that the degree of danger is the second degree of danger, which means that the person appearance area is not dangerous.

The presentation method determination unit 16 determines a presentation method in accordance with a degree of danger determined by the danger determination unit 15. The presentation method determination unit 16 uses different colors for laser light depending on whether the degree of danger determined by the danger determination unit 15 is the first degree of danger or the second degree of danger. For example, if the danger determination unit 15 determines that the degree of danger is the first degree of danger, the presentation method determination unit 16 selects a presentation method in which laser light is red, and if the danger determination unit 15 determines that the degree of danger is the second degree of danger, the presentation method determination unit 16 selects a presentation method in which laser light is blue.

The presentation unit 114 presents a result of recognition in accordance with a presentation method determined by the presentation method determination unit 16. The presentation unit 114 includes at least one of the laser emission section 42, the display section 43, and the sound output section 44.

If the presentation method determination unit 16 selects the presentation method in which laser light is red, for example, the laser emission section 42 emits red laser light to a person appearance area of the first degree of danger detected by the area detection unit 13. If the presentation method determination unit 16 selects the presentation method in which laser light is blue, for example, the laser emission section 42 emits blue laser light to a person appearance area of the second degree of danger detected by the area detection unit 13. As a result, a person can learn the degree of danger in a person appearance area on the basis of the color of laser light emitted.

Alternatively, if the danger determination unit 15 determines that the degree of danger is the first degree of danger, the presentation method determination unit 16 may select a presentation method in which a person appearance area turns red, and if the danger determination unit 15 determines that the degree of danger is the second degree of danger, the presentation method determination unit 16 may select a presentation method in which a person appearance area turns blue. If the presentation method determination unit 16 selects the presentation method in which a person appearance area turns red, the laser emission section 42 may emit, to a person appearance area of the first degree of danger detected by the area detection unit 13, laser light of a color with which the person appearance area turns red. If the presentation method determination unit 16 selects the presentation method in which a person appearance area turns blue, the laser emission section 42 may emit, to a person appearance area of the second degree of danger detected by the area detection unit 13, laser light of a color with which the person appearance area turns blue.

Alternatively, if the presentation method determination unit 16 selects the presentation method in which laser light is red, for example, the laser emission section 42 may emit red laser light having a certain shape to a person appearance area of the first degree of danger detected by the area detection unit 13 while emitting red laser light having a linear shape to the ground between the person appearance area and the autonomous vehicle. If the presentation method determination unit 16 selects the presentation method in which laser light is blue, for example, the laser emission section 42 may emit blue laser light having a certain shape to a person appearance area of the second degree of danger detected by the area detection unit 13 while emitting blue laser light having a linear shape to the ground between the person appearance area and the autonomous vehicle.

Alternatively, the presentation method determination unit 16 may use different sounds depending on whether the degree of danger determined by the danger determination unit 15 is the first degree of danger or the second degree of danger. For example, if the danger determination unit 15 determines that the degree of danger is the first degree of danger, the presentation method determination unit 16 selects a presentation method in which a first sound is output, and if the danger determination unit 15 determines that the degree of danger is the second degree of danger, the presentation method determination unit 16 selects a presentation method in which a second sound is output. If the presentation method in which the first sound is output is determined, the sound output section 44 may output the first sound to a person appearance area of the first degree of danger detected by the area detection unit 13. If the presentation method in which the second sound is output is determined, the sound output section 44 may output the second sound to a person appearance area of the second degree of danger detected by the area detection unit 13.

Alternatively, for example, if the danger determination unit 15 determines that the degree of danger is the first degree of danger, the presentation method determination unit 16 selects a presentation method in which a detected person appearance area turns red, and if the danger determination unit 15 determines that the degree of danger is the second degree of danger, the presentation method determination unit 16 selects a presentation method in which a detected person appearance turns blue. If the presentation method determination unit 16 selects the presentation method in which a detected person appearance turns red, the display section 43 may display an image in which the person appearance area of the first degree of danger detected by the area detection unit 13 is red. If the presentation method determination unit 16 selects the presentation method in which a detected person appearance turns blue, the display section 43 may display an image in which the person appearance area of the second degree of danger detected by the area detection unit 13 is blue.

In addition, if the area detection unit 13 detects a plurality of person appearance areas, the danger determination unit 15 may determine the degree of danger of each of the plurality of person appearance areas detected by the area detection unit 13. The presentation unit 114 may then present a result of recognition of a person appearance area having the highest degree of danger first among the plurality of person appearance areas. If the area detection unit 13 detects a plurality of person appearance areas, for example, the danger determination unit 15 estimates a distance between the autonomous vehicle 1 and each of the plurality of person appearance areas on the basis of a captured image and determines that the degree of danger of a person appearance area closest to the autonomous vehicle 1 is the highest. The presentation unit 114 then gives the person appearance area having the highest degree of danger among the plurality of person appearance areas priority in presenting a result of recognition.

If the number of laser beams that can be emitted by the laser emission section 42 at once is limited, for example, the laser emission section 42 may give a person appearance areas having the highest degree of danger among a plurality of person appearance areas priority in emitting laser light.

In addition, if the laser emission section 42 is capable of emitting two laser beams at once, the laser emission section 42 may emit the laser beams to a person appearance area having the highest degree of danger and a person appearance area having the second highest degree of danger among a plurality of person appearance areas. At this time, the two laser beams preferably have different colors.

In addition, if the number of sounds that can be output by the sound output section 44 at once is limited, for example, the sound output section 44 may give a person appearance area having the highest degree of danger among a plurality of person appearance areas priority in outputting a sound.

In addition, if the sound output section 44 is capable of outputting two sounds at once, the sound output section 44 may output the sounds to a person appearance area having the highest degree of danger and a person appearance area having the second highest degree of danger among a plurality of person appearance areas. At this time, the two sounds are preferably different from each other.

In addition, in the first and second embodiment, some of the components of the recognition result presentation apparatus may be included in a server that can communicate with the recognition result presentation apparatus through a network, instead.

In the present disclosure, some or all of the units, the apparatuses, the members, or the sections, or some or all of the function blocks illustrated in the block diagrams may be achieved by one or a plurality of electronic circuits including a semiconductor device, a semiconductor integrated circuit (IC), or a large-scale integration (LSI) circuit. The LSI circuit or the IC may be fabricated on a single chip, or may be fabricated by combining a plurality of chips. The function blocks other than the storage device, for example, may be integrated on a single chip. Although the terms "LSI" and "IC" are used here, the terms used change depending on a degree of integration, and "system LSI", "very-large-scale integration", or "ultra-large-scale integration" may be used, instead. A field-programmable-gate array (FPGA), which is programmed after an LSI circuit is fabricated, and a reconfigurable logic device, which is capable of reconfiguring connections inside an LSI circuit or setting up circuit sections inside an LSI circuit, can be used for the same purposes.

Furthermore, some or all of the functions or the operations of the units, the apparatuses, the members, or the sections can be achieved by a software process. In this case, software is recorded on one or a plurality of non-transitory recording media such as a ROM, an optical disc, or a hard disk drive, and a function specified by the software is executed by a processor and peripheral devices when the software is executed by the processor. A system or an apparatus may include one or a plurality of non-transitory recording media on which the software is recorded, the processor, and a necessary hardware device, such as an interface.

The recognition result presentation apparatus and a method for presenting a result of recognition in the present disclosure are capable of accurately recognizing that a person will appear on a road and certainly notifying the person that an autonomous moving body has recognized a place where the person will appear and effective as a recognition result presentation apparatus and a method for presenting a result of recognition that present a result of recognition of a recognition target presented by a recognition target presentation apparatus in a moving direction of an autonomous moving body.

What is claimed is:

1. A first apparatus to be mounted on a first autonomous moving body, the first apparatus comprising:

a processor; and a memory storing a computer program, which, when executed by the processor, causes the processor to perform operations including:

detecting, via a camera mounted on the first autonomous moving body, first light that is radiated on a road by a second apparatus which is included in a second autonomous moving body, the first light indicating a first area to which a person will get out of the second autonomous moving body, and presenting, to the person, information indicating that the first autonomous moving body has recognized the first area.

2. The first apparatus according to claim 1, wherein the presenting includes radiating second light as the information toward the first light on the road.

3. The first apparatus according to claim 2, wherein in the radiating, the second light has a linear shape extending between the first light and the first autonomous moving body.

4. The first apparatus according to claim 2, wherein in the radiating, a color of the second light is different from a color of the first light.

5. The first apparatus according to claim 2, wherein in the radiating, the second light projects, onto the road, an image including a text indicating that the first autonomous moving body has recognized the first area.

6. The first apparatus according to claim 2, wherein in the radiating, the second light projects, onto the road, an image including a pattern indicating that the first autonomous moving body has recognized the first area.

7. The first apparatus according to claim 2, wherein in the radiating, the second light is radiated only within a second area across which the first autonomous moving body will run.

8. The first apparatus according to claim 2, wherein in the radiating, the second light at least partially overlaps the first light on the road.

9. The first apparatus according to claim 2, wherein in the radiating, the second light has a same shape as the first light on the road.

10. The first apparatus according to claim 1, wherein the presenting includes outputting a predetermined sound to the person.

11. The first apparatus according to claim 1, wherein the operations further include capturing an image of a scene in a moving direction of the first autonomous moving body, wherein, the detecting includes specifying the first area indicated by the first light from the captured image and the presenting includes displaying, on a front surface of the first autonomous moving body, at least a portion, which includes the first area, of the captured image.

12. The first apparatus according to claim 1, wherein the first light has a predetermined pattern detectable by the first apparatus in the detecting.

13. The first apparatus according to claim 1, wherein the first light is temporally changing light detectable by the first apparatus in the detecting.

14. A method performed by a processor mounted on a first autonomous moving body, the method comprising:

detecting, via a camera mounted on the first autonomous moving body, light that is radiated on a road by an apparatus which is included in a second autonomous moving body, the light indicating an area to which a person will get out of the second autonomous moving body; and presenting, to the person, information indicating that the first autonomous moving body has recognized the area.

* * * * *